(12) United States Patent
Brock (10) Patent No.: US 9,652,791 B1
(45) Date of Patent: May 16, 2017

(54) UPDATING MERCHANT LOCATION FOR CARDLESS PAYMENT TRANSACTIONS

(71) Applicant: Square, Inc., San Francisco, CA (US)

(72) Inventor: Zachary Brock, San Francisco, CA (US)

(73) Assignee: Square, Inc., San Francisco, CA (US)

(*) Notice: Subject to any disclaimer, the term of this patent is extended or adjusted under 35 U.S.C. 154(b) by 625 days.

(21) Appl. No.: 13/763,504

(22) Filed: Feb. 8, 2013

(51) Int. Cl.
*G06Q 30/00* (2012.01)
*G06Q 30/06* (2012.01)

(52) U.S. Cl.
CPC .................. *G06Q 30/0601* (2013.01)

(58) Field of Classification Search
CPC .............................. G06Q 30/06; G06Q 30/08
USPC ................................................ 705/26.1, 27.1
See application file for complete search history.

(56) References Cited

U.S. PATENT DOCUMENTS

2013/0132274 A1* 5/2013 Henderson et al. ............ 705/41

OTHER PUBLICATIONS

Goode, Lauren. *Paying With Square's New Mobile-Payments App.* All Things D. Published Apr. 30, 2012. Retrieved on Nov. 7, 2014. Retrieved from the Internet: URL<http://allthingsd.com/20120430/paying-with-squares-new-mobile-payments-app/>. 3 pages.

* cited by examiner

*Primary Examiner* — James Zurita
(74) *Attorney, Agent, or Firm* — Lee & Hayes, PLLC (57) ABSTRACT

A method that includes receiving, from a user device, a request for a listing of merchants; in response to receiving the request for a listing of merchants, sending, to the user device, data describing one or more merchants and respective initial geographic locations of the one or more merchants; receiving, from the user device, a user request for updating a geographic location of a particular merchant in the one or more merchants; sending a request for an updated geographic location to a computing device of the particular merchant; receiving, from the computing device of the particular merchant, data describing an updated geographic location of the particular merchant; and providing, to the user device, data describing the updated geographic location of the particular merchant.

21 Claims, 8 Drawing Sheets

UPDATING MERCHANT LOCATION FOR CARDLESS PAYMENT TRANSACTIONS

TECHNICAL FIELD

This disclosure relates to cardless payment transactions.

BACKGROUND

When searching for merchants, a user can enter a search query into a search engine. The search query can include a merchant's name or a name of a desired product or service. The user can limit the search by location. The search engine can return results to the user in response to the search query, including any limitations provided by the user. To perform a transaction (e.g., a purchase) with a merchant listed in the search results, the user must visit the merchant's retail store or the merchant's online shopping portal.

In a conventional point-of-sale electronic credit card transaction, the transaction is authorized and captured. In the authorization stage, a physical credit card with a magnetic stripe is swiped through a merchant's magnetic card reader, e.g., as part of a point-of-sale device. A payment request is sent electronically from the magnetic card reader to a credit card processor. The credit card processor routes the payment request to a card network, e.g., Visa or Mastercard, which in turn routes the payment request to the card issuer, e.g., a bank. Assuming the card issuer approves the transaction, the approval is then routed back to the merchant. In the capture stage, the approved transaction is again routed from the merchant to the credit card processor, card network and card issuer, and the payment request can include the cardholder's signature (if appropriate). The capture state can trigger the financial transaction between the card issuer and the merchant, and optionally creates a receipt. There can also be other entities, e.g., the card acquirer, in the route of the transaction. Debit card transactions have a different routing, but also require swiping of the card.

SUMMARY

This specification relates to updating data describing merchants in a listing of merchants that allow cardless payment transactions. A convenient graphical user interface that lists merchants that accept cardless payment transactions can be displayed on a user's user device, e.g., a mobile device. Merchants included in the listing can be ranked based on a geographic distance from the user to the respective merchant. The user can choose to conduct a transaction with a merchant after selecting the merchant using the graphical user interface. As used in this specification, a cardless payment transaction is one where a user conducts the transaction with a merchant at a point of sale using a financial account without physically presenting a payment card to the merchant at the point of sale. In fact, the merchant need not receive any details about the financial account, e.g., the credit card issuer, credit card number, and the like is not provided to the merchant.

Electronic payment transactions between a user and a merchant are generally restricted to situations in which the user is within a predetermined distance of the merchant. The geographic distance between the user and a merchant is generally based on the user's geographic position, for example, as determined by a geolocation data from the user device, and a geographic location of the merchant, as determined by, for example, a known street address for the merchant or by geolocation data from the user device.

In some cases, a merchant's geographic location, as determined by the merchant's known street address, is inconsistent with the merchant's actual geographic location. For example, the merchant may have relocated to a different geographic location or the merchant's known street address was incorrect. In such cases, the listing of merchants may indicate that a merchant is not within a predetermined distance of a user despite the user being located within a predetermined distance of the merchant. In some cases, the merchant's place of business is a mobile shop (e.g., a food truck) that regularly changes geographic locations. In such cases, a user may travel to the merchant's geographic location that was provided in a listing of merchants only to discover that the merchant has relocated to a different geographic location. In either case, the user may be prohibited from conducting an electronic payment transaction with the merchant, since the two are not within a predetermined distance of each other.

To address this issue, the user device sends a request to a payment service system requesting that the merchant's geographic location, as provided in the listing of merchants, be updated to the merchant's correct geographic location. The payment service system sends a request for an updated geographic location to a computing device of the merchant. In response to receiving the request, the merchant updates its geographic location, for example, by providing an updated street address, and sends geolocation data describing the updated geographic location to the payment service system. Alternatively, in response to receiving the request, the merchant's computing device can send geolocation data describing the updated geographic location to the payment service system. The payment service system can update the data describing the merchant in the listing of merchants to include the updated geographic location.

In one aspect, a method includes receiving, from a user device, a request for a listing of merchants; in response to receiving the request for a listing of merchants, sending, to the user device, data describing one or more merchants and respective initial geographic locations of the one or more merchants; receiving, from the user device, a user request for updating a geographic location of a particular merchant in the one or more merchants; sending a request for an updated geographic location to a computing device of the particular merchant; receiving, from the computing device of the particular merchant, data describing an updated geographic location of the particular merchant; and providing, to the user device, data describing the updated geographic location of the particular merchant.

Implementations may include one or more of the following features. Data describing the one or more merchants includes, for each merchant, a respective merchant name and one or more of: a respective initial geographic location of the merchant, one or more coupons provided by the merchant, an icon representing the merchant, or an icon indicating whether the merchant is authorized to perform a transaction with the user. The method further includes updating the data describing the one or more merchants with the updated geographic location of the particular merchant. The method further includes receiving, from the user device, a current geographic location of the user device; and wherein the one or more merchants are located within a threshold distance from the current geographic location of the user device.

In one aspect, a method includes receiving, from a user device, a user request for data describing a particular merchant that is within a threshold distance from a current geographic location of the user device, wherein the data describes the particular merchant as not being within the threshold distance from the current geographic location of the user device; in response to receiving the request for data describing the particular merchant, providing, to the user device, data describing the particular merchant; receiving, from the user device, a user request for updating an initial geographic location of the particular merchant; sending a request for an updated geographic location to a computing device of the particular merchant; receiving, from the computing device of the particular merchant, data describing an updated geographic location of the particular merchant; and providing, to the user device, data describing the updated geographic location of the particular merchant.

Implementations may include one or more of the following features. Data describing the particular merchant includes a respective merchant name and one or more of: a respective initial geographic location of the merchant, one or more coupons provided by the merchant, an icon representing the merchant, or an icon indicating whether the merchant is authorized to perform a transaction with the user. The method further includes updating the data describing the one or more merchants with the updated geographic location of the particular merchant.

Advantages may include one or more of the following. A customer can send a request to update a merchant's geographic location provided in a listing of merchants. Geographic locations of merchants in a listing of merchants can be validated by users. Correction of geographic locations of merchants can be initiated by users.

BRIEF DESCRIPTION OF THE DRAWINGS

Like reference numbers and designations in the various drawings indicate like elements.

DETAILED DESCRIPTION

Figure 1:
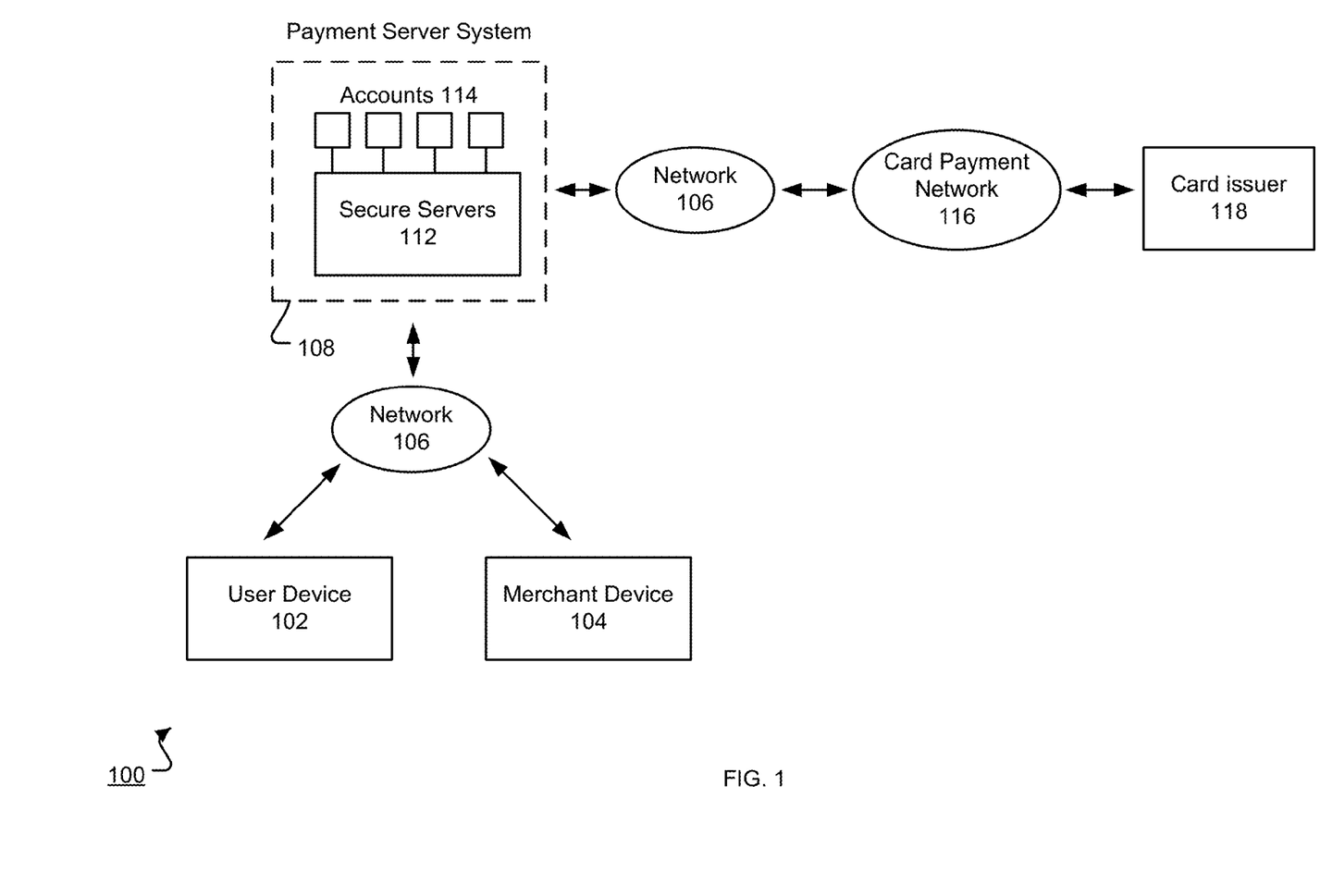
FIG. 1 is a schematic illustration of an example cardless payment system architecture.

FIG. 1 is a schematic illustration of the architecture of an example cardless payment system 100. The overall system 100 includes a user device 102 and merchant device 104 connected to a network 106, e.g., the Internet. The user device 102 is a mobile computing device, e.g., a hand-held computing device, capable of running a user application. For example, the user device 102 can be a mobile device, e.g., a smartphone or tablet computer. The merchant device 104 is also a computing device capable of running a merchant application. The merchant device 104 can be a mobile device, a desktop computer, a laptop computer, a dedicated point of sale system, or other data processing apparatus.

A cardless payment processor operates a payment service system 108. The user device 102 and the merchant device 104 can communicate with the payment service system 108 through the network 106. The payment service system 108 includes one or more servers 112, at least some of which are configured to service secured transactions (e.g., a secure server), and to process electronic payment transactions between the user device 102 and the merchant device 104. In general, servers 112 can store public merchant information, e.g., the merchant's name, street address, and telephone numbers. The servers 112 can also be configured to transfer and update the user application to the user device 102, and to transfer and update the merchant application to the merchant device 104. The servers 112 can store data describing merchants that have merchant accounts 114 with the payment server system 108. The data describing the merchants can include a merchant name, street address, telephone numbers, and theme, e.g., color motif and logos. The servers 112 can be also be configured to send and receive data describing merchants that have merchant accounts 114 with the payment server system 108 to and from the user device 102 and the merchant device 104. The servers 112 can also be configured to send and receive secure information, e.g., credit card numbers, debit card numbers, bank accounts, user accounts, user identifying information, or other sensitive information to and from the user device 102 and the merchant device 104.

The payment service system 108 can communicate with a computer system 116 of a card payment network, e.g., Visa or MasterCard. The payment service system 108 can communicate with a computer system 116 over the network 106, or over a different network. The computer system 116 of the card payment network can communicate with a computer system 118 of a card issuer, e.g., a bank. There can also be computer systems of other entities, e.g., the card acquirer, between the payment service system 108 and the card issuer.

Generally, transactions between the user and the merchant are permitted using the payment server system 108 when the user has a user account with the payment service system 108. Similarly, the merchant also has a merchant account with the payment service system 108. When the user and the merchant enter into a transaction, the transaction can be processed through the exchange of funds between the user account and the merchant account.

Figure 2:
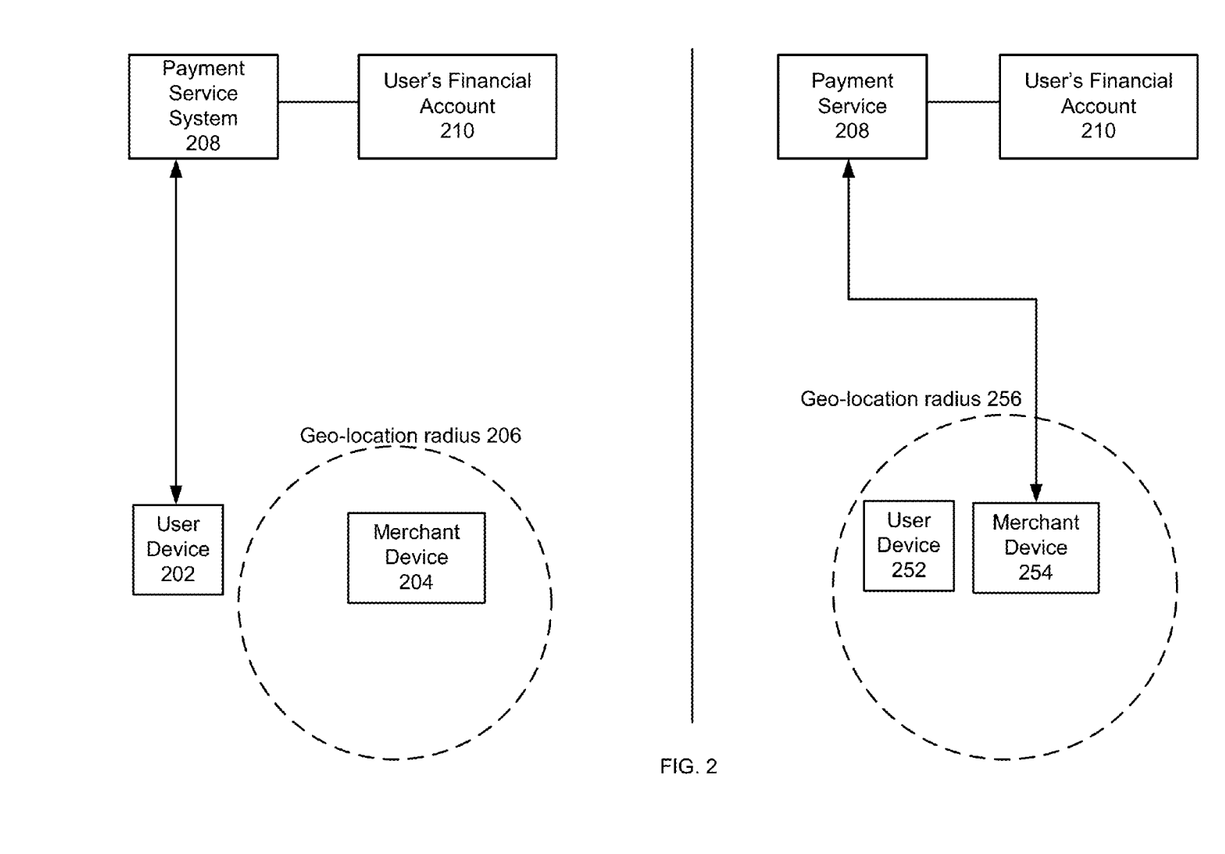
FIG. 2 is a diagram of an example implementation of the cardless payment system.

FIG. 2 is a diagram that outlines an example implementation of the cardless payment system 100. In FIG. 2, a user is interacting with a user device 202 to access a user application while a merchant is interacting with a merchant device 204 to access a merchant application. Users and merchants each have an association, e.g., an account, with the payment service system 208, e.g., the payment service system 108, as described in reference to FIG. 1. For example, the user can interact with the user application to obtain a listing of merchants that accept cardless transactions. The user can further interact with the user application to select and enter into a cardless transaction with a particular merchant.

In some implementations, when conducting cardless transactions, the payment service system 208 defines a geo-location radius, e.g., the geo-location radius 206 and the geo-location radius 256, around the geographic location of a merchant. In such implementations, transactions between a user device and a merchant device are permitted when both the user device and the merchant device are geographically located within the defined geo-location radius. Depending on the implementation, the merchant's geographic location can be determined by geo-locating the merchant device, e.g., the merchant device 204, or based on the merchant's street address. In some implementations, the geo-location radius is defined as a 500 foot radius around the merchant's geographic location. In some implementations, the geo-location radius is set by the merchant. In such implementations, the payment service system 208 receives input from the merchant device, e.g., the merchant device 204, or another computer system of the merchant, specifying the geo-location radius.

In the example of FIG. 2, the merchant application in the merchant device 204 does not provide an option to conduct a cardless payment transaction with the user device 202, since the user device 202 is not located within the geo-location radius 206. In such cases, the user device 202 will indicate to the user that the user is not within the geo-location radius 206 of the merchant. As a result of the user device 202 not being located within the geo-location radius 206, the merchant device 204 will not be able to enter into a transaction with the user.

In contrast, the example of FIG. 2 also illustrates a user is interacting with a user device 252 to access a user application while a merchant is interacting with a merchant device 254 to access a merchant application. The user and the merchant each have an association, e.g., an account, with the payment service system 208, e.g., the payment service system 108, as described in reference to FIG. 1. As described above, the payment service system 208 defines a geo-location radius, e.g., the geo-location radius 256 around the geographic location of a merchant device 254. Since the user device 252 is located within the geo-location radius 256 of the merchant device 254, the user and merchant are able to conduct a cardless transaction.

Figure 3A:
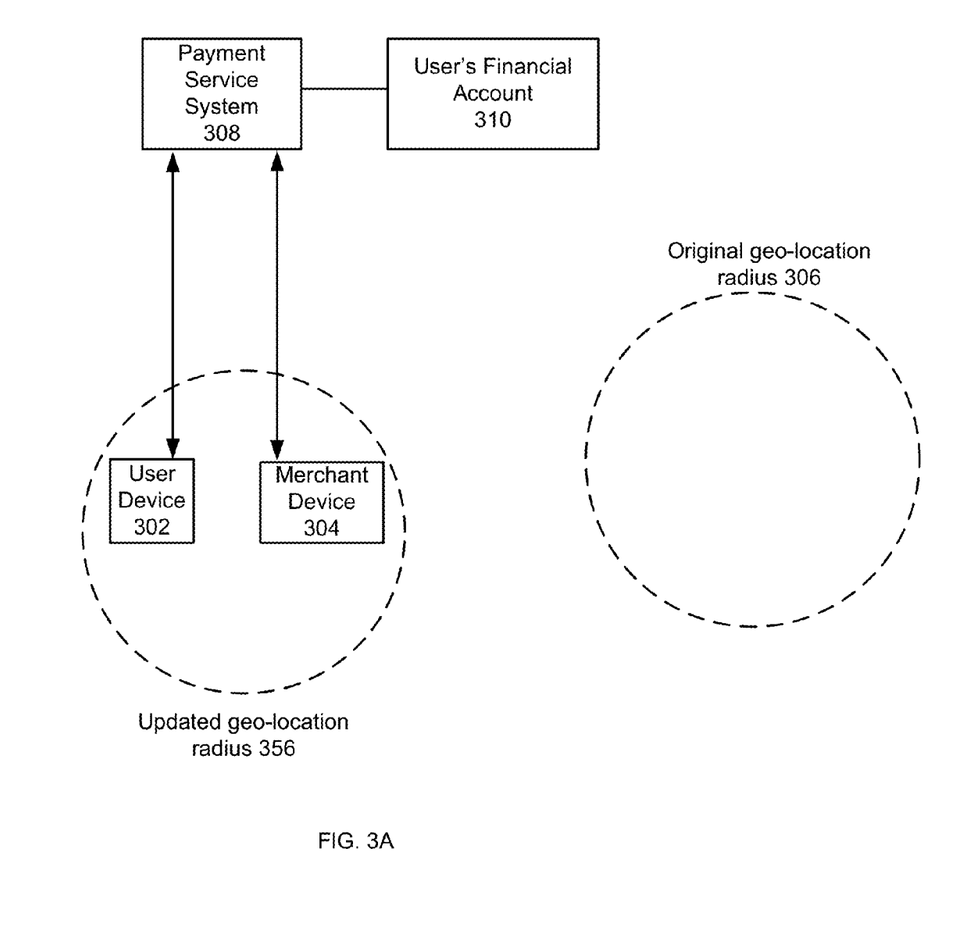
FIGS. 3A-3B are diagrams illustrating a process for updating merchant data.

FIG. 3A is a diagram illustrating a process for updating merchant data. In FIG. 3A, a user is interacting with a user device 302 to access a user application while a merchant is interacting with a merchant device 304 to access a merchant application. As described above, users and merchants each have an association, e.g., an account, with the payment service system 308, e.g., the payment service system 108, as described in reference to FIG. 1.

In the example of FIG. 3A, the user operating the user device 302 is geographically located at the merchant's geographic location, e.g., at the merchant's store. In FIG. 3A, the payment service system 308 will prohibit transactions between the user device 302 and the merchant device 304 because the user device 302 is not geographically located within a geo-location radius 306. In particular, the geo-location radius 306 is defined by the payment system 308 using the merchant's last known street address. However, in the example of FIG. 3A, the merchant is not geographically located at the region defined by the geo-location radius 306. The merchant may have, for example, relocated to a new address without updating its street address with the payment service system 308. Thus, the user device will indicate that the user is not within the geo-location radius 306 of the merchant, which is determined based on the merchant's incorrect street address, when, in fact, the user is actually located at the merchant's geographic location. As a consequence, the merchant and the user are prohibited from conducting a transaction.

The user operating the user device 302 may request that the merchant update its geographic location, e.g., street address, with the payment service system 208. When making the request, the user interacts with the user device 302 to send the request to the payment service system 308 requesting that the merchant's geographic location, as provided in the listing of merchants, be updated. In such implementations, the payment service system 308 sends a request for an updated geographic location to the merchant device 304 of the merchant. In response to receiving the request, the merchant interacts with the merchant device 304 to update its geographic location, for example, by providing an updated street address and sending the updated geographic location to the payment service system 308. For example, in responding to the request, the merchant device 304 can initiate a geolocation query to determine the merchant's geographic location and then send the geolocation data describing the merchant's geographic location to the payment service system 308. The system 308 updates the data describing the merchant in the listing of merchants to include the merchant's updated geographic location. The payment service system 308 can also send data describing the merchant's updated geographic location to the user device 302. Once the merchant's geographic location has been updated, the payment service system 308 can define a new geo-location radius 356 for the merchant's updated geographic location. The payment service system 308 can then determine whether the user device 302 is within the new geo-location radius 356 of the merchant device 304. In FIG. 3A, electronic payment transactions between the user and the merchant can be completed since both the user device 302 and the merchant device 304 are within the new geo-location radius 356.

Figure 3B:
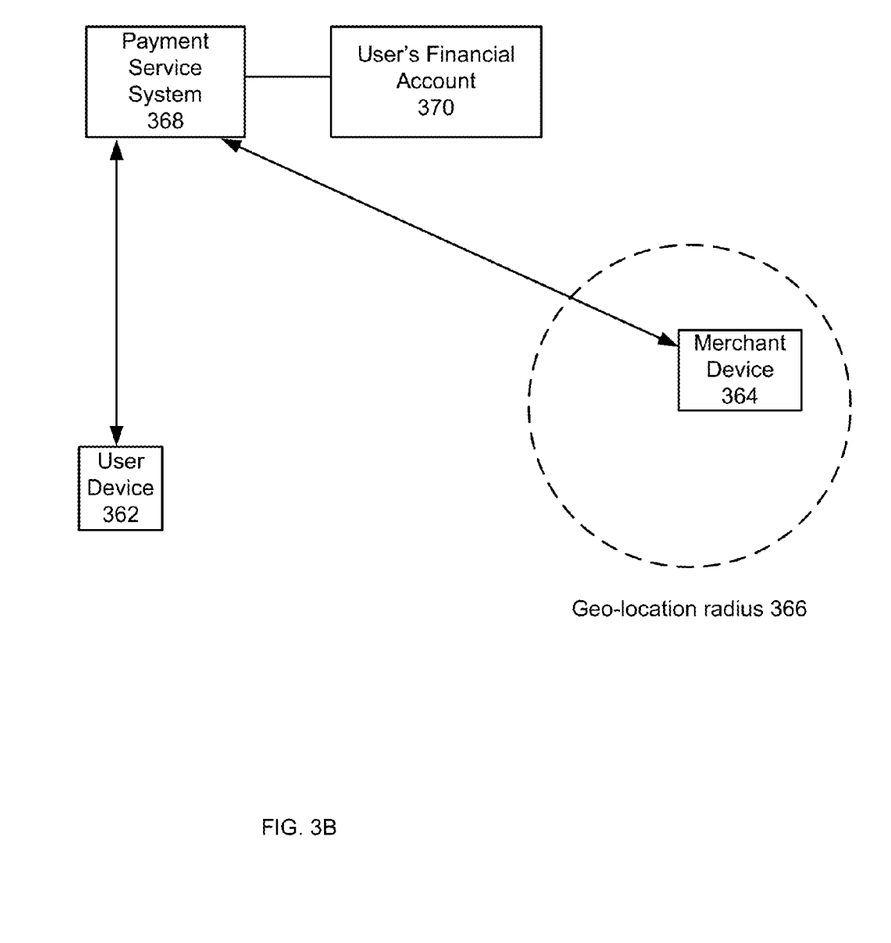

FIG. 3B is a diagram illustrating a process for updating merchant data. In FIG. 3B, a user is interacting with a user device 362 to access a user application while a merchant is interacting with a merchant device 364 to access a merchant application. As described above, users and merchants each have an association, e.g., an account, with the payment service system 368, e.g., the payment service system 108, as described in reference to FIG. 1.

In the example of FIG. 3B, the merchant's place of business is a mobile shop (e.g., a food truck) that regularly changes geographic locations. In FIG. 3B, the user operating the user device 362 is geographically located at a previous geographic location of the merchant that was determined from a listing of merchants accessed using the user device 362. In such situations, the user operating the user device 362 may request that the merchant update its geographic location, e.g., street address, with the payment service system 368 to allow the user to determine the merchant's current geographic location. The user operating the user device can initiate a geographic location update using the process described in reference to FIG. 3A.

Figure 4:
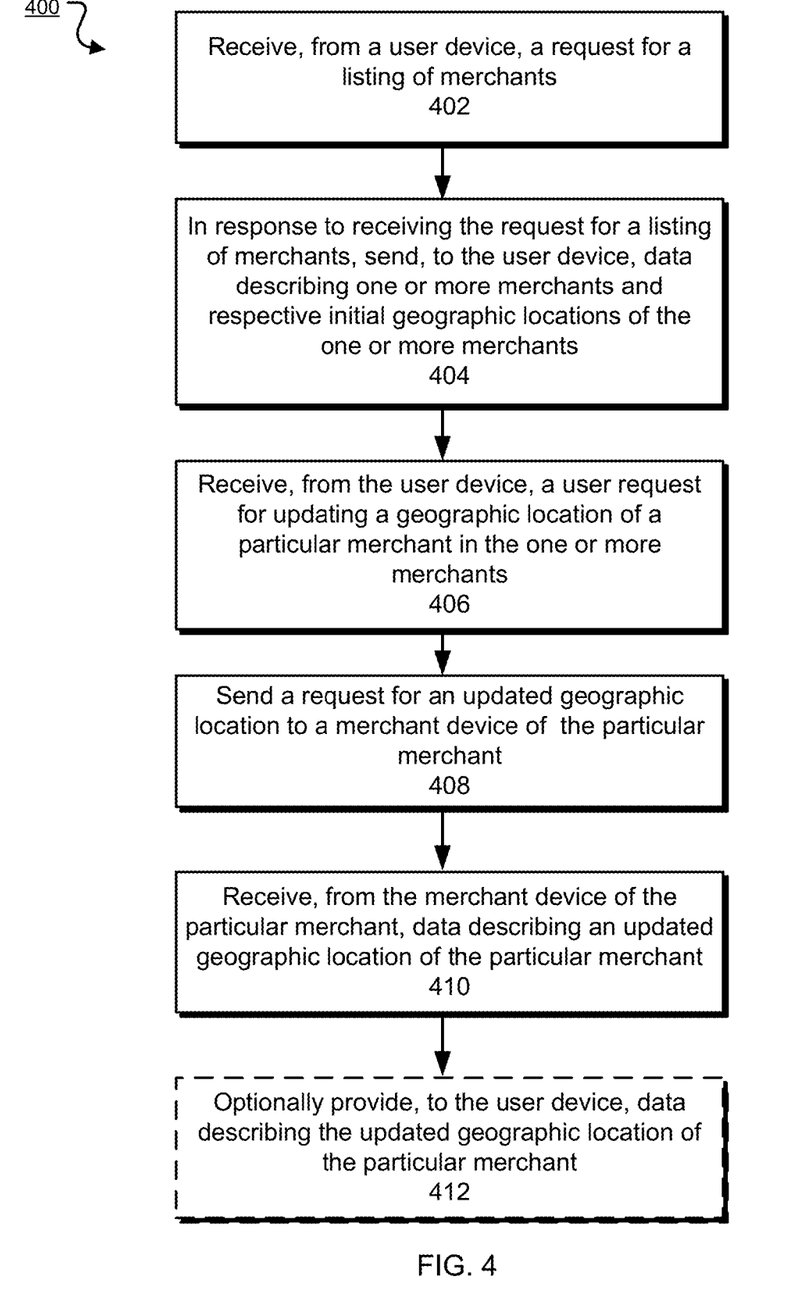
FIG. 4 is a diagram of an example flow chart for updating merchant data.

FIG. 4 is a diagram of an example flow chart of a process 400 for updating merchant data. For convenience, the process 400 will be described as performed by a system including one or more computing devices, e.g., the server system 108, as described in reference to FIG. 1. The system can be configured to send and receive communications between a user device, e.g., the user device 102, and a merchant device, e.g., the merchant device 104. The communications can be encrypted using secure protocols built into the user device, server system, and merchant device. In some implementations, this process is implemented through the applications installed on both the user's user device and the merchant's device.

The system receives, from the user device, a request for a listing of merchants (step 402). Typically, the user launches the user application on the user device. When launching the user application, the user device can communicate a request to the system to identify merchants that can perform cardless payment transactions. The request can include data describing a location of the user device, for example, as determined by the user device.

In response to receiving the request for a listing of merchants, the system sends, to the user device, data describing a listing of one or more merchants (step 404). The listing of one or more merchants includes merchants that have been identified by the system based on the location information of the user device, as described above in reference to FIG. 2. For example, the system can identify one or more merchants based on the user device being located within a respective threshold distance, e.g., a geo-location radius, of a merchant.

In some implementations, the data describing the one or more merchants includes, for each merchant, a respective merchant name and one or more of: a respective initial geographic location of the merchant, one or more coupons provided by the merchant, an icon representing the merchant, or an icon indicating whether the merchant is authorized to perform a transaction with the user.

The system receives, from the user device, a user request for updating a geographic location of a particular merchant in the one or more merchants (step 406). A user can interact with the user device to identify a particular merchant and to request an update of a geographic location of that merchant, as described above in reference to FIG. 3A. In some implementations, a user initiates the request by selecting an option on a graphical user interface, as described below. Once a request is initiated, the user device can communicate the request to the system.

The system sends a request for an updated geographic location to a computing device of the particular merchant (step 408). The system can send the request to a merchant device, as described above in reference to FIG. 3A.

The system receives, from the computing device of the particular merchant, data describing an updated geographic location of the particular merchant (step 410). For example, the merchant can provide the system with an updated geographic location, e.g., street address, as described above in reference to FIG. 3A. The process of providing the system with an updated geographic location can be automated. For example, the computing device of the particular merchant can determine the merchant's geographic location, and can send geolocation data describing the merchant's geographic location to the user device. In some implementations, automation of the process for providing updated geographic locations is enabled when a merchant opts-in. In some implementations, the system updates the data describing the merchant with the updated geographic location. Thus, the system can use the updated geographic location when defining a geo-location radius for the merchant in the future.

The system optionally provides, to the user device, data describing the updated geographic location of the particular merchant (step 412). The system can optionally provide the user device with the updated geographic location to be presented in the listing of merchants.

Figure 5:
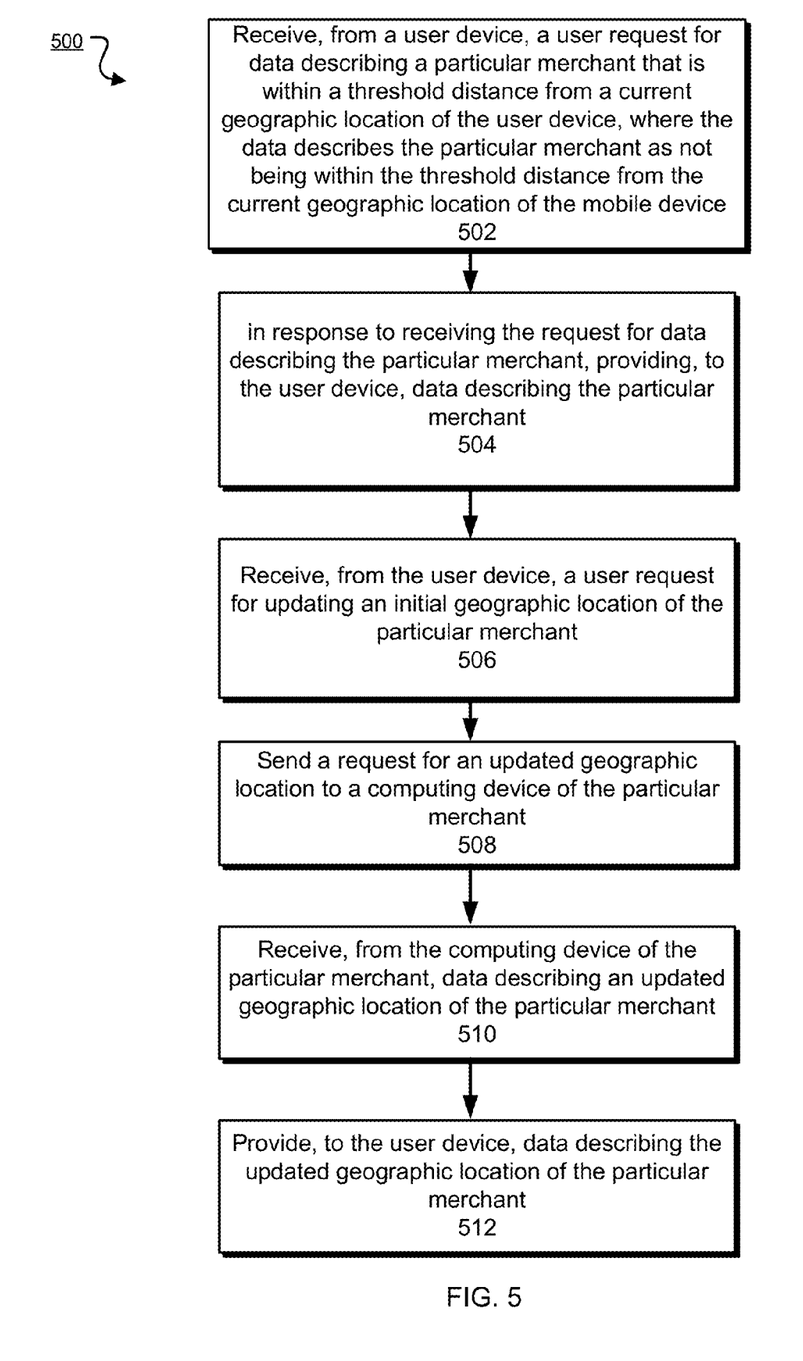
FIG. 5 is a diagram of another example flow chart for updating merchant data.

FIG. 5 is a diagram of an example flow chart of a process 500 for updating merchant data. For convenience, the process 500 will be described as performed by a system including one or more computing devices, e.g., the server system 108, as described in reference to FIG. 1. The system can be configured to send and receive communications between a user device, e.g., the user device 102, and a merchant device, e.g., the merchant device 104. The communications can be encrypted using secure protocols built into the user device, server system, and merchant device. In some implementations, this process is implemented through the applications installed on both the user's user device and the merchant's device.

The system receives, from a user device, a user request for data describing a particular merchant that is within a threshold distance from a current geographic location of the user device, where the data describes the particular merchant as not being within the threshold distance from the current geographic location of the user device (step 502). For example, the user operating the user device may be located at a store of the particular merchant. However, the data describing the particular merchant may indicate that the user is not within a threshold distance of the particular merchant. In particular, the user device may not be within a geo-location radius that was determined for the particular merchant using an incorrect street address.

In instances where the user device is not geographically located within a threshold distance of the particular merchant, the user device can display a message indicating its inability to "check in," or conduct a transaction with the particular merchant (e.g., by displaying a "too far to pay" message). In other words, the merchant cannot charge the user's financial account for a cardless payment transaction until the user is within a threshold distance and the merchant has the user's consent, as described further in reference to FIG. 5. However, if the user device is within the threshold distance, the user device can send an indication, to the system, of being within the threshold distance.

In response to receiving the request for data describing the particular merchant, the system provides, to the user device, data describing the particular merchant (step 504). In some implementations, the data describing the particular merchant includes a respective merchant name and one or more of: a respective initial geographic location of the merchant, one or more coupons provided by the merchant, an icon representing the merchant, or an icon indicating whether the merchant is authorized to perform a transaction with the user.

The system receives, from the user device, a user request for updating an initial geographic location of the particular merchant (step 506). A user can interact with the user device to identify a particular merchant and to request an update of an initial geographic location of that merchant, as described above.

The system sends a request for an updated geographic location to a computing device of the particular merchant (step 508). The system can send the request to a merchant device, as described above in reference to FIG. 3A.

The system receives, from the computing device of the particular merchant, data describing an updated geographic location of the particular merchant (step 510). For example, the merchant can provide the system with an updated geographic location, e.g., street address, as described above. In some implementations, the system updates the data describing the one or more merchants with the updated geographic location of the particular merchant.

The system provides, to the mobile device, data describing the updated geographic location of the particular merchant (step 512).

Figure 6:
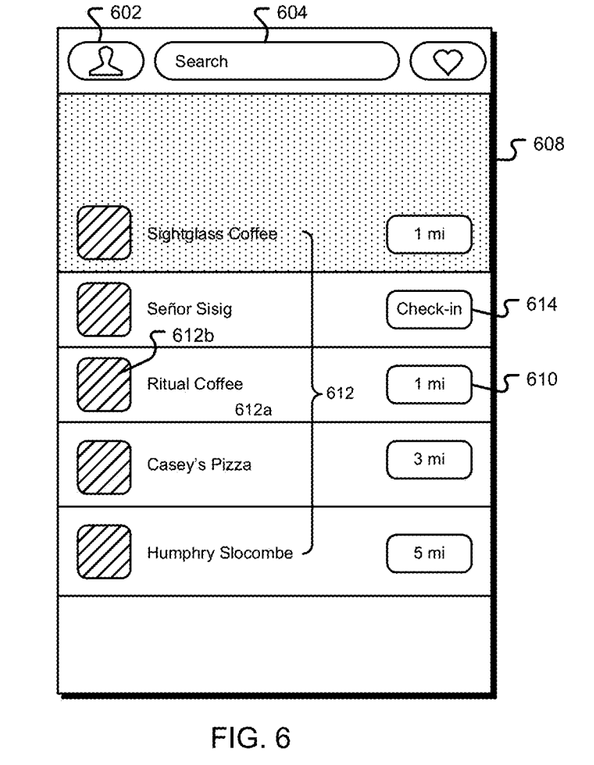
FIG. 6 is a diagram of an example view of an application's main page on the user's user device.

FIG. 6 is a diagram of example view of the user application's main page on a user's user device. The user application can retrieve a list of merchants 612 in response to an application query (e.g., on startup of the application). The application can display the list of merchants 612. The list of merchants can be organized into a plurality of rows, each row containing the name 612a of a single merchant. The list can also include an icon 612b for each merchant, e.g., located in the row with the name of the merchant. For example, each merchant's icon 612b can be located on the left side of the name 612a of the merchant. In some implementations, a cover image 608 for a merchant, e.g., the first merchant in the list, is displayed. The application can display a distance 610 that a merchant is from a current location of the user device.

Each merchant can be represented with a custom-designed "card." In some implementations, tapping the row containing the name 612a of the merchant, or tapping the name 612a of the merchant, will cause the user's user device to display more information regarding the respective merchant. In some implementations, the additional merchant information is represented by a custom-designed merchant page. For example, the user device can display a map around the merchant's area, the merchant's phone number, the merchant's operating hours, or other merchant information, as described in reference to FIGS. 7A and 7B.

The application can present user account information by tapping an account button 602. When provided with input, the application can search for merchants in a search bar 604. For example, the application can send the search query to a cardless payment system and be provided with merchants that are relevant to the search query.

If the current location of the user device is within a threshold distance of a merchant, the application can display a representative symbol (e.g., "Check-in" button 614). By tapping the check in button, the application can, among other things, conduct transactions with the merchant. If the user device's current location is not within the predetermined distance, the application can display a distance 610 from the user device to the merchant.

Figure 7A:
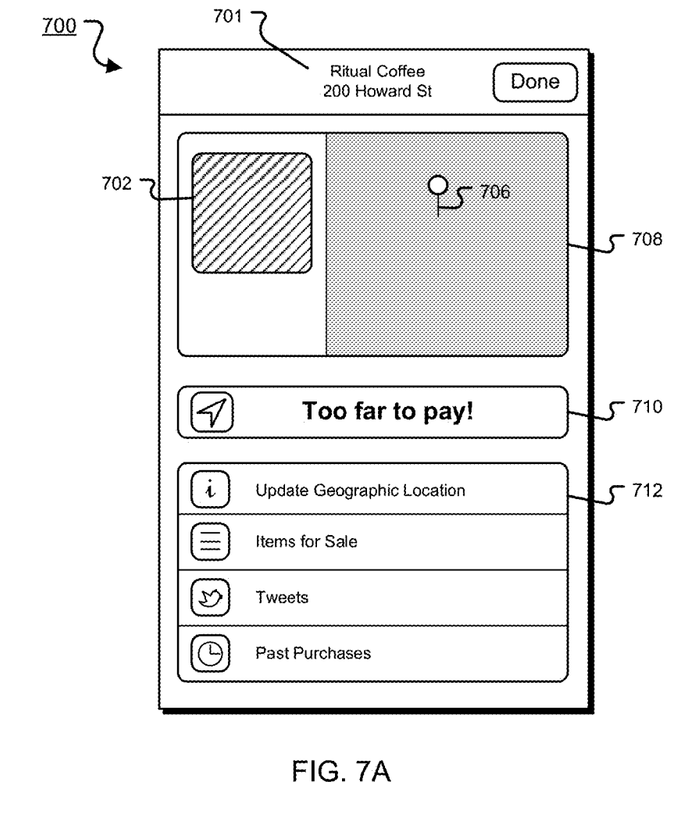
FIGS. 7A-B are diagrams of example application views illustrating the updating of merchant data.

FIG. 7A is a diagram of an example application view 700 when a user that is not within a threshold distance of a merchant. In FIG. 7A, the merchant is a coffee shop "Ritual Coffee." The application 700 shows the name of the merchant, the merchant's street address 701 (e.g., "200 Howard St."), and the merchant's logo 702.

In the example of FIG. 7A, the user is geographically located at a store of the merchant and is attempting to conduct a transaction with the merchant. However, in FIG. 7A, the data describing the merchant's geographic location (e.g., "200 Howard St.") is incorrect because the merchant has relocated to a different address (e.g., "1050 Howard St."). Thus, since the data describing the merchant's geographic location is incorrect, the user is provided with a message 710 (e.g., "Too far to pay!") indicating that the user is not within a threshold distance of the merchant when attempting to conduct the transaction. In such instances, the user can select an option 712 to request that the data describing the merchant's geographic location be updated, as described above. The user can then re-attempt to enter into the transaction once the merchant's geographic location is updated, as described in reference to FIG. 7B.

Figure 7B:
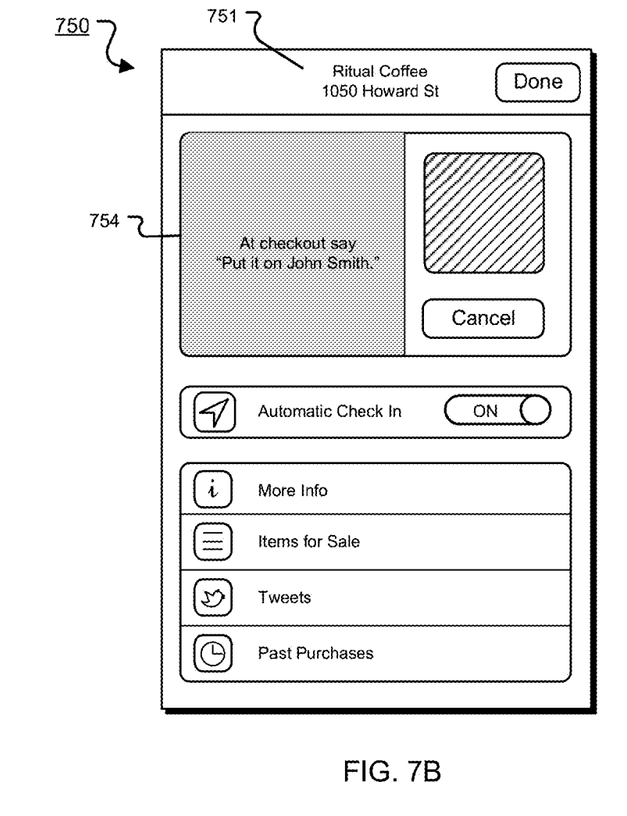

FIG. 7B is a diagram of an example application view 750 after a merchant has updated its geographic location. In FIG. 7B, the merchant's geographic location has been updated in response to a user request from an incorrect street address (e.g., "200 Howard St."), as described in reference to FIG. 7A, to a correct street address 751 (e.g., "1050 Howard St."). In the example of FIG. 7B, the user is geographically located at a store of the merchant and is re-attempting to conduct a transaction with the merchant. Since the user is geographically located within a threshold distance of the updated merchant address (e.g., "1050 Howard St."), the user and the merchant are permitted to conduct the transaction and the application view 750 provides the user instructions 754 for completing the transaction.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a non-transitory computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
    storing, in a database of a payment server, information associated with a financial account of a user, wherein the financial account is associated with a mobile device of the user;
    receiving, from the mobile device, via a network, an indication of a current geographic location of the mobile device;
    receiving, from the mobile device via the network, a request for a listing of merchants;
    in response to receiving the request for the listing of merchants, sending, to the mobile device via the network, first data describing one or more merchants, the first data describing the one or more merchants including respective initial geographic locations of the one or more merchants;

defining, based at least in part on an initial geographic location of a particular merchant of the one or more merchants, an initial geo-location around the particular merchant, wherein a payment system can process, using the financial account, payment transactions between the user and the particular merchant based at least in part on the current geographic location of the mobile device being within the initial geo-location around the particular merchant;

determining that the current geographic location of the mobile device is not within the initial geo-location around the particular merchant;

receiving, from the mobile device via the network, a request for updating the initial geographic location of the particular merchant;

sending, to a merchant point-of-sale (POS) device of the particular merchant, a request for an updated geographic location of the particular merchant;

receiving, from the merchant POS device of the particular merchant, second data describing the updated geographic location of the particular merchant;

updating, based at least in part on the updated geographic location of the particular merchant, the initial geo-location around the particular merchant in order to define an updated geo-location around the particular merchant;

providing, to the mobile device via the network, third data describing the updated geographic location of the particular merchant;

determining that the current geographic location of the mobile device is within the updated geo-location around the particular merchant; and based at least in part on determining that the current geographic location of the mobile device is within the updated geo-location around the particular merchant, processing a payment transaction between the user and the particular merchant using the financial account and without physically presenting a payment card to the merchant.

2. The method of claim 1, wherein the first data describing the one or more merchants further includes, for each merchant, a respective merchant name and one or more of: one or more coupons provided by the merchant, an icon representing the merchant, or an icon indicating whether the merchant is authorized to perform a transaction.

3. The method of claim 1, wherein the one or more merchants are located within a threshold distance from the current geographic location of the mobile device.

4. The method of claim 1, wherein before receiving the request for updating the initial geographic location of the particular merchant, the method further comprises:

determining to refrain from processing an initial payment transaction between the user and the particular merchant.

5. A method, comprising:

storing information associated with a financial account, wherein the financial account is associated with a user device;

receiving, from the user device via a network, an indication of a current geographic location of the user device;

receiving, from the user device via the network, a request for first data describing a merchant that is within a threshold distance from the current geographic location of the user device, wherein the first data describing the merchant indicates the merchant not being within the threshold distance from the current geographic location of the user device;

in response to receiving the request for the first data describing the merchant, providing, to the user device via the network, the first data describing the merchant, wherein providing the first data describing the merchant causes an application on the user device to not allow the user device to conduct a payment transaction with the merchant using the financial account;

receiving, from the user device via the network, a request for updating an initial geographic location of the merchant;

sending, to a computing device of the merchant, a request for an updated geographic location of the merchant;

receiving, from the computing device of the merchant, second data describing the updated geographic location of the merchant, the second data describing the updated geographic location indicating that the merchant is within the threshold distance from the current geographic location of the user device;

providing, to the user device via the network, third data describing the updated geographic location of the merchant, wherein providing the third data describing the updated geographic location causes the application on the user device to allow the user device to conduct the payment transaction with the merchant using the financial account; and processing the payment transaction between the user device and the merchant using the financial account.

6. The method of claim 5, wherein the first data describing the merchant includes a merchant name and one or more of: the initial geographic location of the merchant, one or more coupons provided by the merchant, an icon representing the merchant, or an icon indicating whether the merchant is authorized to perform a transaction.

7. The method of claim 5, further comprising:

updating the first data describing the merchant with the updated geographic location of the merchant.

8. A system comprising:

a processor; and computer-readable medium coupled to the processor and having instructions stored thereon, which, when executed by the processor, cause the processor to perform operations comprising:

storing information associated with a financial account, wherein the financial account is associated with a user device;

receiving, from the user device via a network, an indication of a current geographic location of the user device;

receiving, from the user device via the network, a request for a listing of merchants;

in response to receiving the request for the listing of merchants, sending, to the user device via the network, first data describing one or more merchants, the first data describing the one or more merchants including respective initial geographic locations of the one or more merchants;

defining, based at least in part on an initial geographic location of a particular merchant of the one of more merchants, an initial geo-location around the particular merchant, wherein the system can process, using the financial account, payment transactions between the user device and the particular merchant based at least in part on the current geographic location of the user device being within the initial geo-location around the particular merchant;
determining that the current geographic location of the user device is not within the initial geo-location around the particular merchant;
receiving, from the user device, a request for updating the initial geographic location of the particular merchant;
sending, to a computing device of the particular merchant, a request for an updated geographic location of the particular merchant;
receiving, from the computing device of the particular merchant, second data describing the updated geographic location of the particular merchant;
updating, based at least in part on the updated geographic location of the particular merchant, the initial geo-location around the particular merchant in order to define an updated geo-location around the particular merchant;
providing, to the user device via the network, third data describing the updated geographic location of the particular merchant;
determining that the current geographic location of the user device is within the updated geo-location around the particular merchant; and
based at least in part on determining that the current geographic location of the user device is within the updated geo-location around the particular merchant, processing a payment transaction between the user device and the particular merchant using the financial account.

9. The system of claim 8, wherein the first data describing the one or more merchants further includes, for each merchant, a respective merchant name and one or more of: one or more coupons provided by the merchant, an icon representing the merchant, or an icon indicating whether the merchant is authorized to perform a transaction.

10. The system of claim 8 wherein the one or more merchants are located within a threshold distance from the current geographic location of the mobile device.

11. The system of claim 8, wherein before receiving the request for updating the initial geographic location of the particular merchant, the operations further comprising:
determining to refrain from processing an initial payment transaction between the user and the particular merchant.

12. A system comprising:
a processor; and
computer-readable medium coupled to the processor and having instructions stored thereon, which, when executed by the processor, cause the processor to perform operations comprising:
storing information associated with a financial account, wherein the financial account is associated with a user device;
receiving, from the user device via a network, an indication of a current geographic location of the user device;
receiving, from the user device via the network, a request for first data describing a merchant that is within a threshold distance from the current geographic location of the user device, wherein the first data describing the merchant indicates the merchant as not being within the threshold distance from the current geographic location of the user device;
in response to receiving the request for the first data describing the merchant, providing, to the user device via the network, the first data describing the merchant, wherein providing the first data describing the merchant causes an application on the user device to not allow the user device to conduct payment transactions with the merchant using the financial account;
receiving, from the user device via the network, a request for updating an initial geographic location of the merchant;
sending, to a computing device of the merchant, a request for an updated geographic location of the merchant;
receiving, from the computing device of the merchant, second data describing the updated geographic location of the merchant, the second data describing the updated geographic location indicating that the merchant is within the threshold distance from the current geographic location of the user device;
providing, to the user device via the network, third data describing the updated geographic location of the merchant, wherein providing the third data describing the updated geographic location causes the application on the user device to allow the user device to conduct a payment transaction with the merchant using the financial account; and
processing the payment transaction between the user device and the merchant using the financial account.

13. The system of claim 12, wherein the first data describing the merchant includes a merchant name and one or more of: the initial geographic location of the merchant, one or more coupons provided by the merchant, an icon representing the merchant, or an icon indicating whether the merchant is authorized to perform a transaction.

14. The system of claim 12, the operations further comprising:
updating the first data describing the merchant with the updated geographic location of the merchant.

15. A non-transitory computer-readable medium having instructions stored thereon, which, when executed by a processor, cause the processor to perform operations comprising:
storing information associated with a financial account, wherein the financial account is associated with a mobile device;
receiving, from the mobile device via a network, an indication of a current geographic location of the mobile device;
receiving, from the mobile device via the network, a request for a listing of merchants;
in response to receiving the request for the listing of merchants, sending, to the mobile device via the network, first data describing one or more merchants, the first data describing the one or more merchants including respective initial geographic locations of the one or more merchants;
defining, based at least in part on an initial geographic location of a particular merchant of the one of more merchants, an initial geo-location around the particular merchant, wherein a payment system can process, using the financial account, payment transactions between the user and the particular merchant based at least in part on the current geographic location of the mobile device being within the initial geo-location around the particular merchant;
determining that the current geographic location of the mobile device is not within the initial geo-location around the particular merchant;

receiving, from the mobile device via the network, a request for updating the initial geographic location of the particular merchant;

sending, to a computing device of the particular merchant, a request for an updated geographic location of the particular merchant;

receiving, from the computing device of the particular merchant, second data describing the updated geographic location of the particular merchant;

updating, based at least in part on the updated geographic location of the particular merchant, the initial geo-location around the particular merchant in order to define an updated geo-location around the particular merchant;

providing, to the mobile device via the network, third data describing the updated geographic location of the particular merchant;

determining that the current geographic location of the mobile device is within the updated geo-location around the particular merchant; and based at least in part on determining that the current geographic location of the mobile device is within the updated geo-location around the particular merchant, processing a payment transaction between the user and the particular merchant using the financial account.

16. The non-transitory computer-readable medium of claim 15, wherein the first data describing the one or more merchants further includes, for each merchant, a respective merchant name and one or more of: one or more coupons provided by the merchant, an icon representing the merchant, or an icon indicating whether the merchant is authorized to perform a transaction.

17. The non-transitory computer-readable medium of claim 15, wherein the one or more merchants are located within a threshold distance from the current geographic location of the mobile device.

18. The non-transitory computer-readable medium of claim 15, wherein before receiving the request for updating the initial geographic location of the particular merchant, the operations further comprising:

determining to refrain from processing an initial payment transaction between the user and the particular merchant.

19. A non-transitory computer-readable medium having instructions stored thereon, which, when executed by a processor, cause the processor to perform operations comprising:

storing information associated with a financial account, wherein the financial account is associated with a user device;

receiving, from the user device via a network, an indication of a current geographic location of the user device;

receiving, from the user device via the network, a request for first data describing a merchant that is within a threshold distance from the current geographic location of the user device, wherein the first data describing the merchant indicates the merchant as not being within the threshold distance from the current geographic location of the user device;

in response to receiving the request for the first data describing the merchant, providing, to the user device via the network, the first data describing the merchant, wherein providing the first data describing the merchant causes an application on the user device to not allow the user device to conduct payment transactions with the merchant using the financial account;

receiving, from the user devices via the network, a request for updating an initial geographic location of the merchant;

sending, to a computing device of the merchant, a request for an updated geographic location of the merchant;

receiving, from the computing device of the merchant, second data describing the updated geographic location of the merchant, the second data describing the updated geographic location indicating that the merchant is within the threshold distance from the current geographic location of the user device;

providing, to the user device via the network, third data describing the updated geographic location of the merchant, wherein providing the third data describing the updated geographic location causes the application on the user device to allow the user device to conduct a payment transaction with the merchant using the financial account; and processing the payment transaction between the user device and the merchant using the financial account.

20. The non-transitory computer-readable medium of claim 19, wherein the first data describing the merchant includes a merchant name and one or more of: the initial geographic location of the merchant, one or more coupons provided by the merchant, an icon representing the merchant, or an icon indicating whether the merchant is authorized to perform a transaction.

21. The non-transitory computer-readable medium of claim 19, the operations further comprising:

updating the first data describing the merchant with the updated geographic location of the merchant.

* * * * *